W. L. DODD.
WHEEL.
APPLICATION FILED JAN. 28, 1910.
970,476.
Patented Sept. 20, 1910.
Fig. 1.
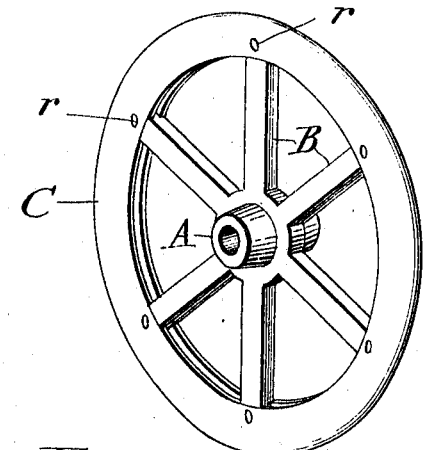
Fig. 2. Fig. 3.
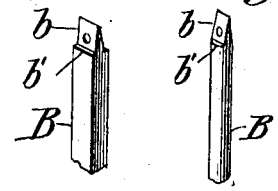
Fig. 4. Fig. 5. Fig. 6. Fig. 7. Fig. 8.
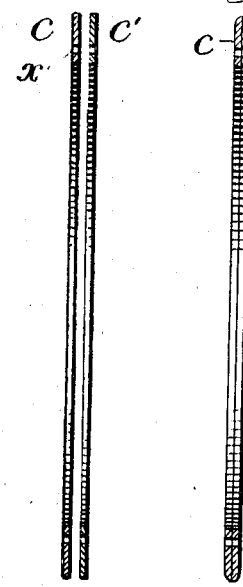  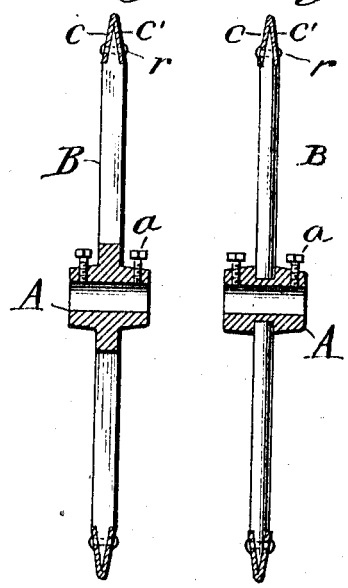
Witnesses.
C. B. Franzoni
M. E. Burrell
Inventor:
Walter L. Dodd.
by Baldwin & Wight
attys.

UNITED STATES PATENT OFFICE.

WALTER L. DODD, OF WESTVILLE, INDIANA.

WHEEL.

970,476.  Specification of Letters Patent.  Patented Sept. 20, 1910.

Application filed January 28, 1910. Serial No. 540,509.

*To all whom it may concern:*

Be it known that I, WALTER L. DODD, a citizen of the United States, residing in Westville, in the county of Laporte and State of Indiana, have invented certain new and useful Improvements in Wheels, of which the following is a specification.

The object of my invention is to provide a simple, strong and durable wheel especially intended for use in seed planting machines and like machines for operating the markers and seed planting devices.

My improved wheel comprises a rim, made by welding together the outer edges of two annular pieces of sheet metal, and a spider consisting of a hub and radial spokes, the outer ends of which are secured in the space between the sides of the rim.

In the drawings:—Figure 1 is a perspective view of a wheel made according to my invention. Fig. 2 is a detail view of the outer end of one of the spokes, shown in Fig. 1. Fig. 3 is a detail view of another form of spoke. Fig. 4 shows two annular pieces of sheet metal which may be cut or stamped out for the purpose of forming the two parts of the rim. Fig. 5 shows how these two rings are placed together in condition to have their outer edges welded. Fig. 6 shows how the rings after their outer edges have been welded are spread apart for the purpose of receiving the outer ends of the spokes. Fig. 7 shows a vertical central section through a wheel with the hub, spokes and rim assembled. Fig. 8 is a similar view of a modified form of wheel.

In constructing a wheel, in accordance with my invention, I cut two annular pieces for the rim from sheet metal, as indicated at $c$, $c'$ in Fig. 4. These are formed with holes $x$ to receive rivets. The two members $c$, $c'$ are placed side by side as indicated in Fig. 5 and their outer edges are welded together, as indicated at $y$. Then the members are spread apart, as indicated in Fig. 6.

The spider may comprise a hub A and spokes B which may be formed in any suitable way and may be attached to the rim C by rivets or bolts $r$. As indicated in Fig. 7 the spokes B may be cast integrally with the hub A, and set screws $a$ may be provided for attaching the wheel to an axle. In Fig. 8 the hub A is provided with round spokes B which are attached to the hub in any suitable way. The outer ends of the spokes are tapered, as indicated at $b$ in Figs. 2 and 3, and provided with shoulders $b'$ which rest against the inner edges of the rim members $c$, $c'$.

By my improvements a very efficient wheel is produced which is especially suitable for use in agricultural machinery.

In some cases it is necessary to spread the members $c$, $c'$ wide apart in order to receive the spokes and then bend them to the shape shown in Figs. 6, 7 and 8 or when the spokes are of metal the rim members may be first applied to the spokes and then their outer edges may be welded.

I claim as my invention:

1. A wheel, comprising a hub, radial spokes and a rim consisting of two annular pieces of sheet metal welded together at their outer edges and having their inner edges spread apart and containing the outer ends of the spokes between them, said spokes being in contact with said rim and being directly connected thereto.

2. A wheel, comprising a rim V-shaped in cross section composed of two annular pieces of sheet metal welded together at their outer edges and spread apart at their inner edges thus forming a space V-shaped in cross section, a hub and radial spokes having their outer ends tapered and shouldered entering the V-shaped space in the rim and riveted thereto, the inner edges of the rim bearing against the shoulders of the spokes.

In testimony whereof, I have hereunto subscribed my name.

WALTER L. DODD.

Witnesses:
 B. F. CASS,
 B. B. BARNARD.